United States Patent
Tseng

(10) Patent No.: US 7,334,500 B2
(45) Date of Patent: Feb. 26, 2008

(54) PEDAL CRANK HAVING SOLID COUPLING

(76) Inventor: Leon Tseng, No. 45-3, Santsun Juang, Santsun Li, Changhua 50077 (TW)

( * ) Notice: Subject to any disclaimer, the term of this patent is extended or adjusted under 35 U.S.C. 154(b) by 281 days.

(21) Appl. No.: 11/131,773

(22) Filed: May 17, 2005

(65) Prior Publication Data

US 2006/0260434 A1    Nov. 23, 2006

(51) Int. Cl.
*G05G 1/14* (2006.01)
(52) U.S. Cl. ..................... 74/594.1; 74/594.2
(58) Field of Classification Search ............... 74/594.1, 74/594.2; 280/210; *F16D 1/06*
See application file for complete search history.

(56) References Cited

U.S. PATENT DOCUMENTS

| | | | | |
|---|---|---|---|---|
| 3,508,618 A | * | 4/1970 | Walberg | ..................... 172/253 |
| 5,085,620 A | | 2/1992 | Nagano | ..................... 474/152 |
| 5,133,695 A | | 7/1992 | Kobayashi | ..................... 474/160 |
| 5,493,937 A | * | 2/1996 | Edwards | ..................... 74/594.1 |
| 6,938,516 B2 | * | 9/2005 | Yamanaka | ..................... 74/594.1 |
| 6,983,672 B2 | * | 1/2006 | Smith | ..................... 74/594.1 |
| 2005/0081678 A1 | * | 4/2005 | Smith et al. | ..................... 74/594.1 |
| 2005/0116438 A1 | * | 6/2005 | Wang et al. | ..................... 280/210 |

FOREIGN PATENT DOCUMENTS

FR    2 615 160     * 11/1988
GB    2 002 089 A   * 2/1979

* cited by examiner

*Primary Examiner*—Vinh T. Luong
(74) *Attorney, Agent, or Firm*—Charles E. Baxley

(57) ABSTRACT

A pedal crank includes a crank arm having a hole formed in one end to receive one end of a crank shaft which may be rotatably attached to a bicycle frame. An expanding device may be engaged in the end of the crank shaft for expanding the crank shaft to engage with the crank arm, and to solidly secure the crank shaft to the crank arm. The crank arm and the crank shaft may include knurled surfaces for solidly engaged with each other. The expanding device includes a locking member engaged into the crank shaft and having an inclined outer peripheral surface for engaging with the crank shaft, and for expanding the crank shaft when the locking member is moved relative to the crank shaft.

8 Claims, 4 Drawing Sheets

PEDAL CRANK HAVING SOLID COUPLING

BACKGROUND OF THE INVENTION

1. Field of the Invention

The present invention relates to a pedal crank, and more particularly to a pedal crank having a crank arm and a crank shaft that may be solidly secured together and that may include a decreased weight.

2. Description of the Prior Art

Typical pedal cranks comprise a crank shaft rotatably attached or secured in a hanger or a hub of a bicycle frame, and a pair of crank arms secured to the ends of the crank shaft with one or more fasteners, or even by forging or welding processes. Normally, one or more gear wheels or sprockets are attached or secured to the crank arms and/or the crank shaft, and thus rotated in concert with the crank arms and/or the crank shaft, and for allowing the gear wheels or sprockets to be rotated or driven by the crank arms and/or the crank shaft.

For example, U.S. Pat. No. 5,085,620 to Nagano discloses one of the typical multi-gear clusters for bicycles and also comprises one or more gear wheels or sprockets attached onto the crank arms and/or the crank shaft, for being rotated or driven by the crank arms and/or the crank shaft. However, the crank arms and/or the gear wheels or sprockets are required to be solidly secured to the crank shaft with one or more fasteners, and the fasteners are normally made of heavy metal materials and may not be removed, such that the typical multi-gear clusters may greatly increase the weight of the bicycles.

U.S. Pat. No. 5,133,695 to Kobayashi discloses another typical bicycle multiple chainwheel and also comprises one or more gear wheels or sprockets that are formed integral with the crank arms and that are solidly secured to the crank shaft with one or more fasteners, for allowing the gear wheels or sprockets and the crank shaft to be rotated or driven by the crank arms. However, the fasteners are also normally made of heavy metal materials and may not be removed, such that the typical multiple chainwheel may also greatly increase the weight of the bicycles.

In addition, it is to be noted that the structure of the conventional pedal cranks may only be made of heavy metal materials that include a heavy weight, and may not be made of other light weight materials, such as carbon fibers or glass fibers or other composite materials. For decreasing the weight of the bicycles, more and more conventional pedal cranks have been made of light weight materials, such as carbon fibers or glass fibers or other composite materials.

However, the conventional pedal cranks are normally the crank arms and/or the crank shaft and/or the gear wheels or sprockets are required to be solidly secured together with one or more fasteners, adhesive materials, or by latch pins, or by threading engagements. However, the coupling between crank arms and/or the crank shaft and/or the gear wheels or sprockets may be easily become loose after use.

The present invention has arisen to mitigate and/or obviate the afore-described disadvantages of the conventional pedal cranks for bicycles.

SUMMARY OF THE INVENTION

The primary objective of the present invention is to provide a pedal crank including a crank arm and a crank shaft that may be solidly secured together into a solid coupling structure, and that may include a decreased weight.

In accordance with one aspect of the invention, there is provided a pedal crank comprising a crank arm including a first end having a hole formed therein, a crank shaft for rotatably attaching to a bicycle frame, and including a first end engaged into the hole of the crank arm, and an expanding device for expanding the first end of the crank shaft to engage with the crank arm, and to secure the crank shaft to the crank arm.

The crank arm includes a knurled surface formed in the hole thereof, and the crank shaft includes a knurled surface formed in an outer peripheral portion of the first end thereof, for engaging with the knurled surface of the crank arm, and for solidly securing the crank shaft and the crank arm together.

The expanding device includes a locking member engaged into the first end of the crank shaft and having an inclined outer peripheral surface formed thereon for engaging with the crank shaft, and for expanding the first end of the crank shaft when the locking member is moved relative to the crank shaft.

The crank shaft includes an inclined surface formed in the first end thereof, for engaging with the inclined outer peripheral surface of the locking member. The crank shaft includes a bore formed therein, and includes a peripheral protrusion extended radially into the bore thereof, for engaging with the locking member.

The crank shaft includes a knurled surface formed thereon, to form the peripheral protrusion therein. The crank arm includes a knurled surface formed in the hole thereof, for engaging with the knurled surface of the crank shaft, and for solidly securing the crank shaft and the crank arm together.

The expanding device includes a fastener having a first end threaded with the locking member, for moving the locking member relative to the crank shaft when the fastener is rotated relative to the crank shaft. The fastener includes a second end having an enlarged head provided thereon for engaging with the crank shaft. The fastener includes a washer attached onto the second end thereof for engaging between the enlarged head and the crank shaft.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
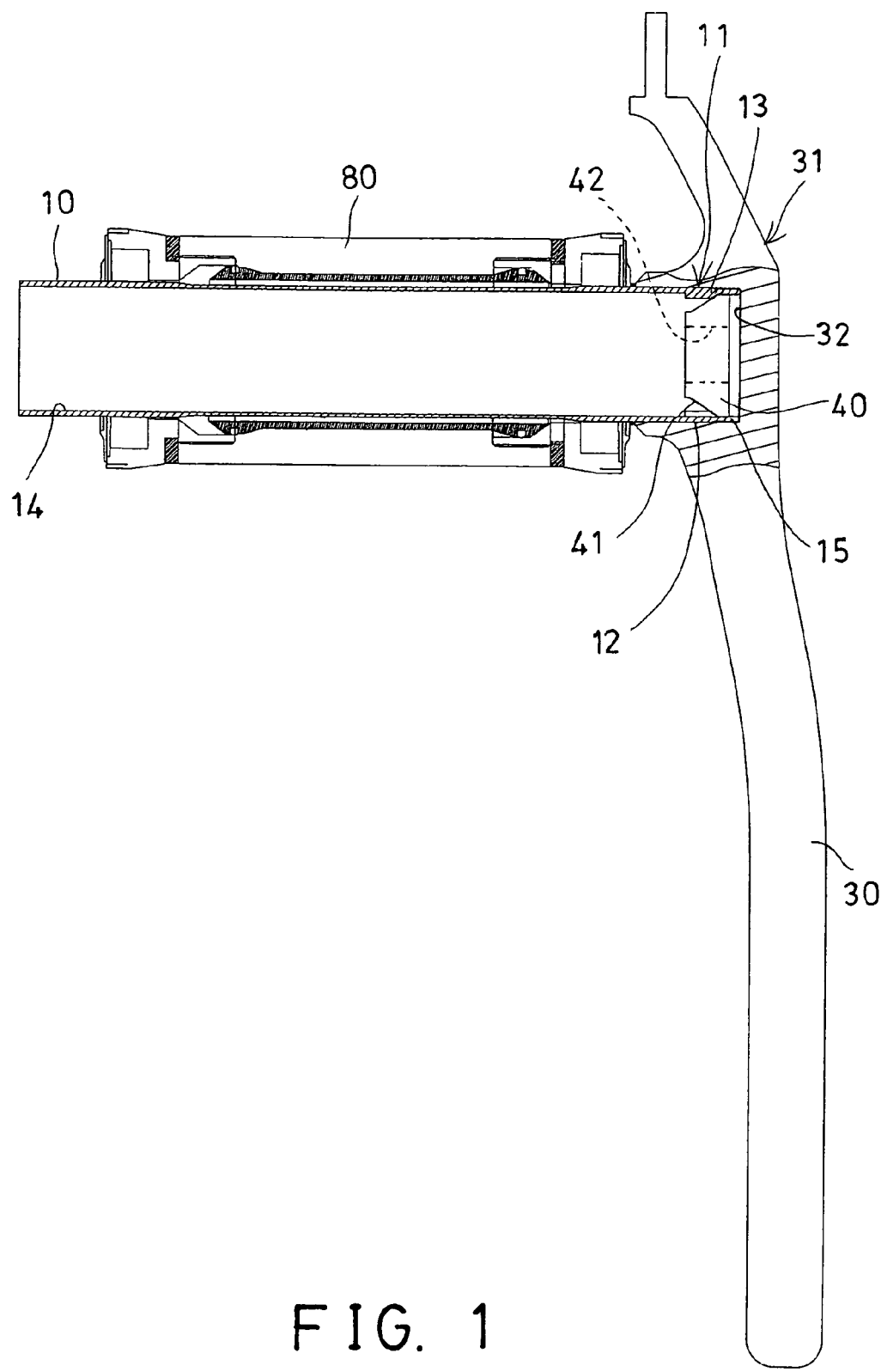
FIG. 1 is a partial cross sectional view of a pedal crank in accordance with the present invention.
Figure 2:
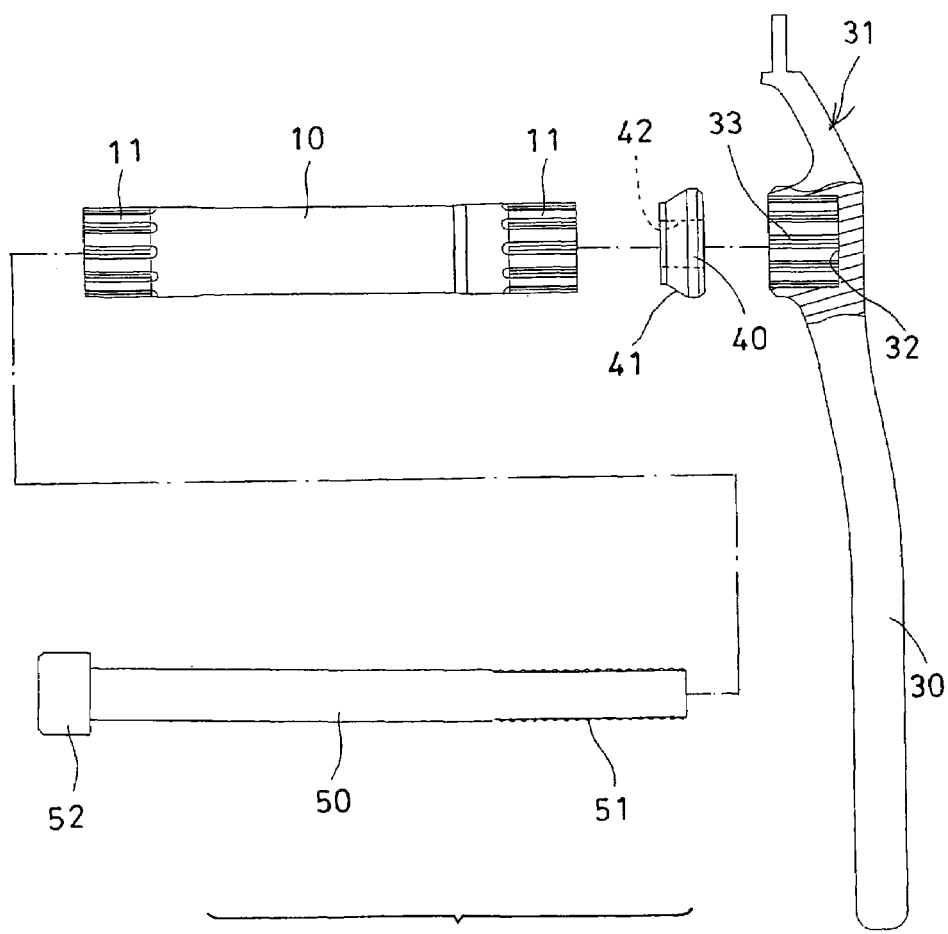
FIG. 2 is an exploded view of the pedal crank.
Figure 3:
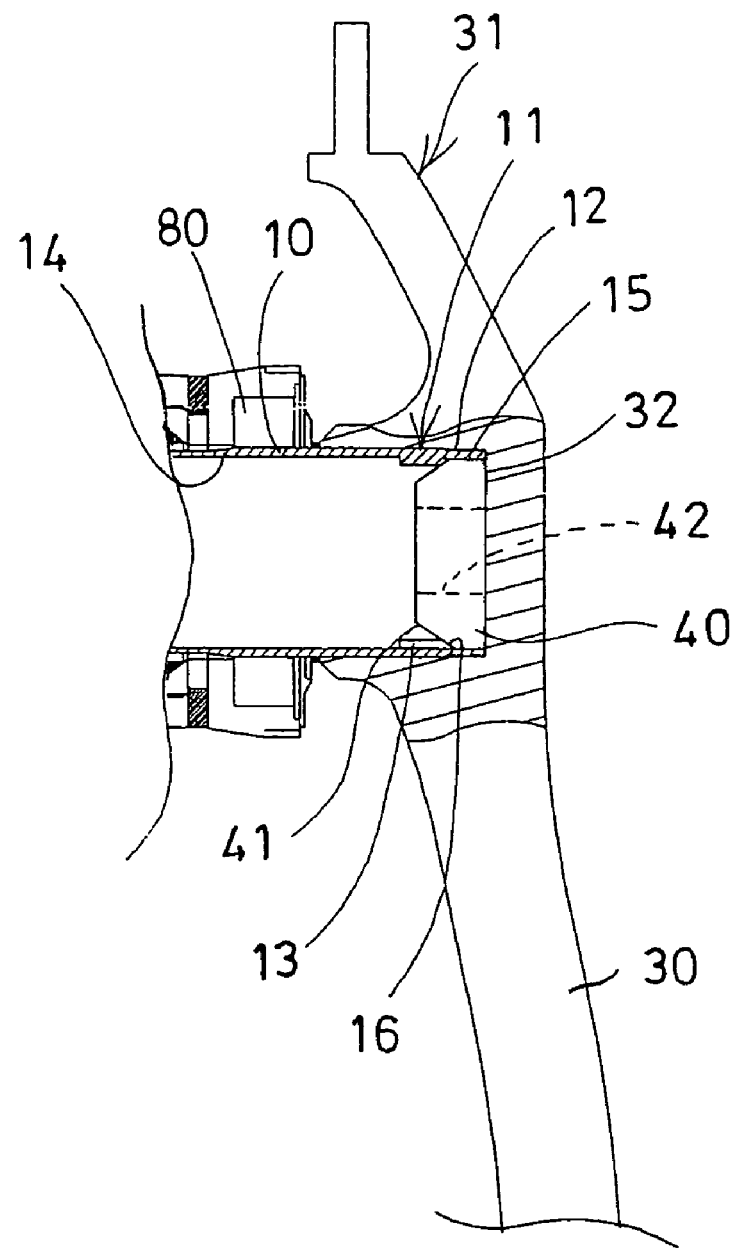
FIG. 3 is an enlarged partial cross sectional view illustrating the assembling operation of the pedal crank.

Referring to the drawings, and initially to FIGS. 1-3, a pedal crank in accordance with the present invention comprises a crank shaft 10 to be rotatably attached or secured in a hanger or a hub 80 of a bicycle frame (not shown), and the crank shaft 10 includes one or both ends 11 each having a knurled peripheral surface 12 formed thereon, and may have a number of protrusions or a peripheral protrusion 13 extended radially into a bore 14 thereof while forming the knurled peripheral surface 12 thereon, for example.

It is preferable that the crank shaft 10 includes one or both ends 11 each having an inner peripheral shoulder 15 formed therein, and having an inner diameter smaller than that of the protrusion 13 thereof, but preferably having an inner diameter no less than that of the crank shaft 10; and includes an inclined surface 16 formed therein and located between the inner peripheral shoulder 15 and the protrusions 13 thereof, best shown in FIG. 3.

The pedal crank further includes a crank arm 30 to be attached or secured to the end 11 of the crank shaft 10. For example, the crank arm 30 includes a blind hole 32 formed in one end or first end 31 thereof for receiving the end portion 11 of the crank shaft 10, and preferably includes a knurled surface 33 formed thereon, such as formed in the inner peripheral portion of the blind hole 32 of the crank arm 30, for engaging with the corresponding knurled peripheral surface 12 of the crank shaft 10, best shown in FIGS. 1, 3, 4.

An anchoring or locking member 40 is to be engaged into the one end 11 of the crank shaft 10, and includes an outer diameter equals to or slighter greater or slighter smaller than the inner diameter of the inner peripheral shoulder 15 or of the crank shaft 10, for allowing the locking member 40 to be forced or engaged into the one end 11 of the crank shaft 10, before engaging the one end 11 of the crank shaft 10 into the blind hole 32 of the crank arm 30, and thus for allowing the one end 11 of the crank shaft 10 to be deeply or completely engaged into the blind hole 32 of the crank arm 30.

Figure 4:
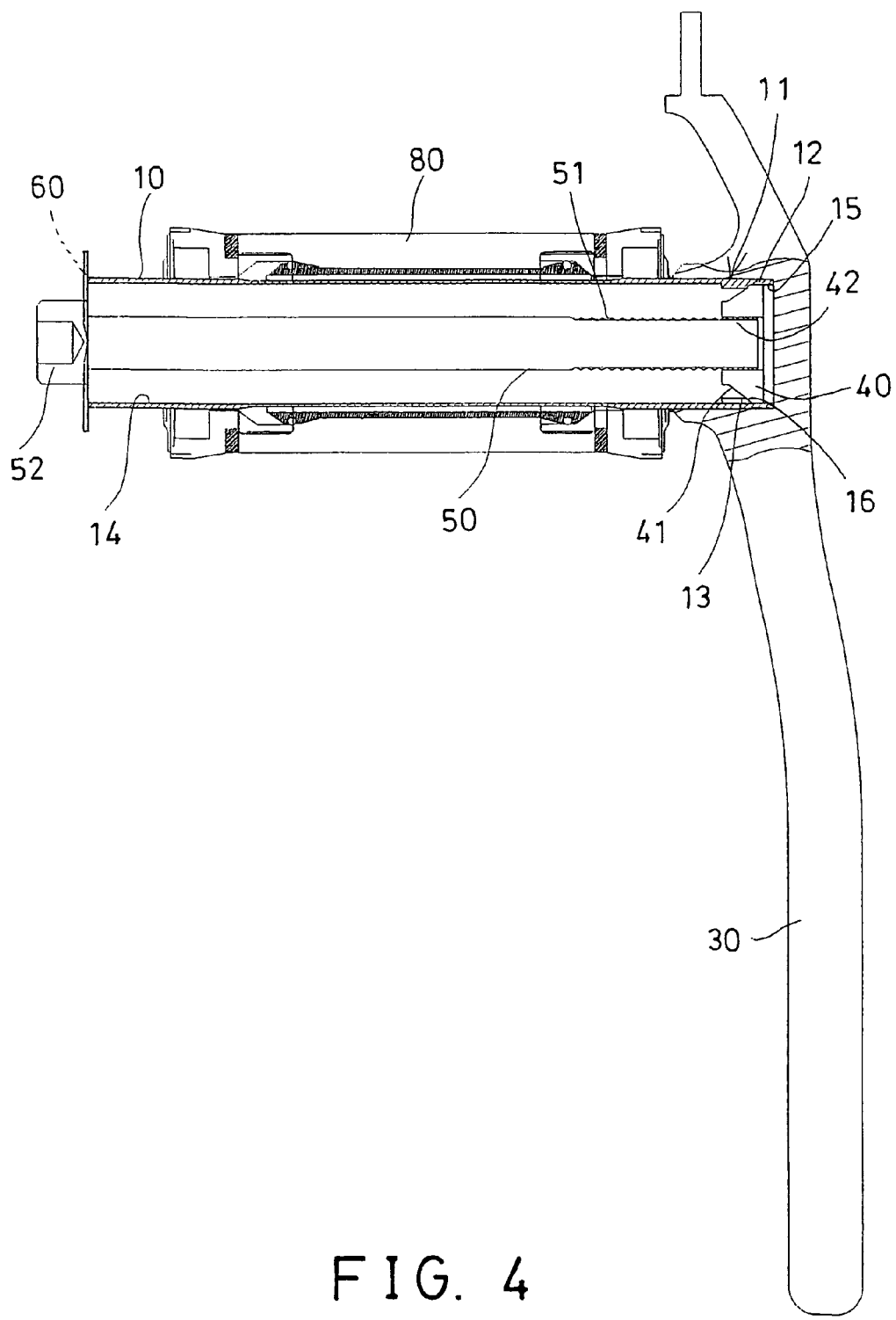
FIG. 4 is a partial cross sectional view illustrating the assembling operation of the pedal crank.

The locking member 40 includes an inclined outer peripheral surface 41 formed thereon for engaging with the corresponding inclined surface 16 of the crank shaft 10, also best shown in FIGS. 1, 3, 4, and includes an inner thread or a screw hole 42 formed therein, for threading or engaging with a bolt or fastener 50 which includes an outer thread 51 formed on one end thereof for engaging with and for threading with the screw hole 42 of the locking member 40, and which includes an enlarged head 52 formed on the other end thereof.

In operation, or while assembling the crank arm 30 and the crank shaft 10 together, as shown in FIG. 4, after the one end 11 of the crank shaft 10 is engaged into the blind hole 32 of the crank arm 30, the fastener 50 is engaged through the bore 14 of the crank shaft 10 and has the outer thread 51 engaged or threaded with the screw hole 42 of the locking member 40, and may have the enlarged head 52 directly engaged onto the other end 11 of the crank shaft 10, or indirectly engaged onto the other end 11 of the crank shaft 10 with a washer 60 which may be attached onto the other end of the fastener 50.

When the fastener 50 is rotated relative to the crank shaft 10 and the crank arm 30 and the locking member 40, due to the threading engagement between the outer thread 51 of the fastener 50 and the screw hole 42 of the locking member 40, the locking member 40 may be forced to move or may be pulled into the bore 14 of the crank shaft 10, or to move in a direction away from the crank arm 30, and the one end 11 of the crank shaft 10.

Particularly, when the locking member 40 is forced into the bore 14 of the crank shaft 10, the protrusion 13 of the crank shaft 10 may be forced radially and outwardly by the locking member 40 to solidly engage with the crank arm 30 by the sliding engagement between the inclined surface 16 of the crank shaft 10 and the inclined outer peripheral surface 41 of the locking member 40, or the one end 11 of the crank shaft 10 may be enlarged or expanded to. solidly engage with the crank arm 30, and thus to allow the crank arm 30 and the crank shaft 10 to be solidly secured together into a solid coupling structure by the locking member 40.

After the crank arm 30 and the crank shaft 10 have been solidly secured together by the locking member 40, the fastener 50 may be rotated or unthreaded relative to the locking member 40, and may thus be disengaged from the crank shaft 10 and the crank arm 30, as best shown in FIG. 1, such that the fastener 50 may be disengaged or removed from the pedal crank, and such that the pedal crank in accordance with the present invention may include a decreased weight. The locking member 40 and/or the fastener 50 may thus be formed as a locking or expanding means or device for expanding the one end 11 of the crank shaft 10 to solidly engage with the crank arm 30.

It is to be noted that the crank arm 30 and/or the crank shaft 10 and/or the hub 80 may be selectively made of metal or non-metal materials, such as carbon fibers or glass fibers or other composite materials, to allow the weight of the pedal crank to further be decreased. The conventional pedal cranks for bicycles failed to teach or to provide a locking member 40 engaged in one end 11 of the crank shaft 10, to enlarge or to expand the crank shaft 10 to solidly engage with the crank arm 30, and thus to solidly secure the crank arm 30 and the crank shaft 10 together with by the locking member 40.

Accordingly, the pedal crank in accordance with the present invention includes a crank arm and a crank shaft that may be solidly secured together into a solid coupling structure, and that may include a decreased weight.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pedal crank comprising:
   a crank arm including a first end having a hole formed therein,
   a crank shaft for rotatably attaching to a bicycle frame, and including a first end engaged into said hole of said crank arm, and
   means for expanding said first end of said crank shaft to engage with said crank arm, and to secure said crank shaft to said crank arm, said expanding means including a locking member engaged into said first end of said crank shaft and having an inclined outer peripheral surface formed thereon for engaging with said crank shaft, and for expanding said first end of said crank shaft when said locking member is moved relative to said crank shaft, and said expanding means including a fastener having a first end threaded with said locking member, for moving said locking member relative to said crank shaft when said fastener is rotated relative to said crank shaft.

2. The pedal crank as claimed in claim 1, wherein said crank arm includes a knurled surface formed in said hole thereof, and said crank shaft includes a knurled surface formed in an outer peripheral portion of said first end thereof, for engaging with said knurled surface of said crank arm, and for solidly securing said crank shaft and said crank arm together.

3. The pedal crank as claimed in claim 1, wherein said crank shaft includes an inclined surface formed in said first end thereof, for engaging with said inclined outer peripheral surface of said locking member.

4. The pedal crank as claimed in claim 1, wherein said crank shaft includes a bore formed therein, and includes a peripheral protrusion extended radially into said bore thereof, for engaging with said locking member.

5. The pedal crank as claimed in claim 4, wherein said crank shaft includes a knurled surface formed thereon, to form said peripheral protrusion therein.

6. The pedal crank as claimed in claim 5, wherein said crank arm includes a knurled surface formed in said hole thereof, for engaging with said knurled surface of said crank shaft, and for solidly securing said crank shaft and said crank arm together.

7. The pedal crank as claimed in claim 1, wherein said fastener includes a second end having an enlarged head provided thereon for engaging with said crank shaft.

8. The pedal crank as claimed in claim 7, wherein said fastener includes a washer attached onto said second end thereof for engaging between said enlarged head and said crank shaft.

* * * * *